United States Patent [19]

Magrans, Jr.

[11] 4,296,020

[45] Oct. 20, 1981

[54] POLYUREA THICKENED MOLDING COMPOSITIONS

[75] Inventor: Juan J. Magrans, Jr., Newark, Del.

[73] Assignee: ICI Americas Inc., Wilmington, Del.

[21] Appl. No.: 89,128

[22] Filed: Oct. 29, 1979

[51] Int. Cl.³ ...................... C08L 67/00; C08L 75/02; C08L 75/06
[52] U.S. Cl. ............................... 260/37 N; 260/40 R; 260/42.18; 260/42.53; 264/331.16; 525/28; 525/30; 525/44; 525/48; 525/49; 525/417; 525/440; 525/452
[58] Field of Search ............. 260/40 R, 37 N; 525/28, 525/30, 44, 48, 49, 417, 440, 452, 540; 260/42.18, 42.53; 264/331.16

[56] References Cited

U.S. PATENT DOCUMENTS 4,073,828  2/1978  Ferrarini et al. .
4,129,641 12/1978  Ferrarini et al. .

Primary Examiner—J. Ziegler

[57] ABSTRACT

Ethylenically unsaturated monomer solutions of ethylenically unsaturated polyester, polyester urethane and polyisocyanurate resins are quickly converted to moldable gels by the homogeneous formation therein of polyurea resins by the interaction of polyamines and polyisocyanates. Tack-free handleable moldable gels are formed within minutes which can be stored under normal conditions for long periods of time until molded. Fully cured intractable articles are formed by the polymerization of the ethylenically unsaturated ingredients.

17 Claims, No Drawings

POLYUREA THICKENED MOLDING COMPOSITIONS

BACKGROUND OF THE INVENTION

This invention is directed to blends of polyamines, ethylenically unsaturated monomers and certain ethylenically unsaturated resins such as vinyl-terminated polyester urethane resins, ethylenically unsaturated polyester resins, and ethylenically unsaturated polyisocyanurate resins, which can be thickened by the addition of polyisocyanates to form polyurea molding compositions which are tack-free within a few minutes. It is also directed to the gelled or thickened unsaturated monomer solutions of these resins which are obtained by the homogeneous intermixing of polyamines and polyisocyanates. It is further directed to a process for the formation of gelled solutions wherein a relatively large molar excess of aromatic polyisocyanate is added to an ethylenically unsaturated monomer solution containing polyamines and one or more of the ethylenically unsaturated polyester, polyisocyanurate or polyester urethane resins. When fully cured by addition reaction between the ethylenically unsaturated components the resulting compositions are surprisingly high in flexural and tensile strength. The molded compositions made from the resins of this invention when mixed with glass and other fillers, pigments, peroxides, mold release agents and so forth can be converted into tractable, tack-free, handleable gels which can be cut into preforms and shaped by either injection or compression molding techniques.

PRIOR ART

Molding compositions employing ethylenically unsaturated polyester resin blends having unreacted carboxyl groups and vinyl monomers have been thickened by the addition or inorganic materials such as calcium or magnesium oxide. Gelation takes place rather slowly with the employment of these oxides and in some instances requires as much as two or three days to obtain a handleable or non-sticky sheet molding product. If not molded within a short period of time thereafter they must be discarded since the gelation and cross-linking continues to a point where the composition is no longer tractable.

In recent years the automobile industry has been striving to reduce weight in newly manufactured vehicles as a means of increasing gas mileage. A most attractive way to reduce weight is to substitute metal with lightweight plastic components. However plastics are inherently weak and must be highly reinforced to meet the tensile strength requirements of certain components such as wheels, brackets, structural panels and bumpers. In order to meet these requirements resins must be reinforced with materials such as glass fiber filaments in high concentrations mostly exceeding 50% by weight. Compositions having large amounts of filler while producing very strong completely cured resins are difficult to mold in articles having uniformly distributed reinforcing materials. In producing molded articles having intricate shapes wherein a pre-form containing fiber reinforcement is squeezed between male/female sections of a mold and the flowout exceeds 30% it is difficult to obtain a uniformly reinforced article. Usually resin flows away from the fiber filler leaving the article more highly filled in the region of the preform and scantily filled or resin rich at the mold extremities or locations of maximum flowout.

More recently however polyurethane resins systems have been used to thicken ethylenically unsaturated monomers and monomer solutions of polyester where there are insufficient reaction sites present within the system which can undergo a thickening reaction with the alkaline oxides. Such systems are described in U.S. Pat. Nos. 3,047,530; 3,290,208; 3,455,857; 3,464,935; 3,644,569; 3,700,752; 3,859,381; 3,868,431; 3,886,229; 3,893,956; 3,962,370; 3,994,764; 3,997,490; 4,062,826; 4,086,203; 4,128,600 and commonly assigned copending application U.S. Ser. No. 928,690 filed 7/27/78 of Ferrarini, et al now U.S. Pat. No. 4,232,133. The thickener systems described in these a patents and applications include both linear and branch polyurethane copolymers and have been used to thicken monomer solutions of ethylenically unsaturated polyester resins.

Of particular interest are patents directed to thickener systems employing both urethane and urea linkages as described in U.S. Pat. Nos. 4,073,828 and 4,129,641. Such systems employ an —NCO terminated polyester free of ethylenic unsaturation having a molecular range of 500–3,000 as a polyisocyanate source for reaction with a polyamine. The present system differs in that a relatively high molecular weight polyamine is reacted with a relatively low molecular weight polyisocyanate to form a composition having only polyurea linkages in the gel resin polymer chain. Because the rate of reaction between amines and isocyanates is extremely fast, unsaturated monomer can be readily thickened or gelled by 5–50% by weight of polyurea precursor. In addition to monomer may be incorporated 5–95% by weight of a prepolymerized resin which may or may not contain ethylenic unsaturation. For example ethylenically unsaturated polyesters, ethylenically unsaturated polyisocyanurates and polyethylenically unsaturated polyester urethane resins are particularly compatible and can be converted within minutes to a handleable tack-free gel which can be stored under normal conditions for long periods of time before they are formed by injection and compression molding techniques.

In the practice of the invention essentially three steps are taken:

The first involves formation of an ethylenically unsaturated monomer solution having dissolved therein 1.5–30% by weight based on the total weight of said solution of a polyamine free of ethylenic unsaturation. This solution may also contain 30–70% by weight of a soluble polymeric resin which contains ethylenic unsaturation.

In the second step the monomer solution is gelled or thickened by the addition thereto of an organic polyisocyanate free of ethylenic unsaturation.

In the third step the gelled material is molded and fully cured by the polymerization of the monomer and/or copolymerization of the monomer and unsaturated resin.

POLYMER-IN-MONOMER SOLUTIONS

Polyester Resins

The hereinafter described unsaturated monomers may be used in combination with from 30–70% by weight of ethylenically unsaturated resins. Such resins may include unsaturated polyester resins made by reacting carboxylic acids or their an hydrides with polyhydric alcohols. These materials usually have molecular weights ranging from 400–4,000 and often 1,000–3,000. Unsaturated polyesters can be prepared by a procedure wherein at least one of the reactive components contains alpha, beta-ethylenic unsaturation. These resins are primarily linear and can contain branch chains by the addition of polyols or polycarboxylic acids having more than two functional groups. Usually they contain a plurality of ethylenically unsaturated linkages distributed along the backbone of their polymer chains. The use of alpha, beta-ethylenically unsaturated polycarboxylic acid provides a convenient method of introducing ethylenic unsaturation into the polyester resin. It is preferred to employ dicarboxylic acids such as maleic, fumaric, citraconic, gamma-dimethylcitraconic, mezaconic, itaconic, alpha methylitaconic, gamma-methylitaconic, tetraconic and alike as well as mixtures thereof but minor amounts of alpha, beta-ethylenically unsaturated polycarboxcylic acids containing three or more carboxylic groups such as aconitic and alike together with the dicarboxylic acids are also useful.

Whenever available the anhydrides of any of the afore mentioned alpha, beta-ethylenically unsaturated polycarboxylic acid may be substituted for the acid. In addition suitable saturated acids, or their anhydrides when available, may also be incorporated along with the unsaturated polyesters and include for example phthalic acid or anhydride, isophthalic acid, terephthalic acid, tetrabromophthalic acid, tetrachlorophthalic acid, adipic acid, sebacic acid, glutaric acid or pimelic acid or their mixtures. Of particular interest may be mentioned a mixture of isophthalic or orthophthalic acid and fumaric or maleic acids.

Any of a large number of ethylenically unsaturated or saturated polyhydric alcohols may be employed with any of the above suitable mixtures. Dihydric alcohols and especially saturated aliphatic diols are preferred as coreactants in the preparation of polyester resins. Among the dihydric alcohols which may be employed are saturated aliphatic diols such as ethylene glycol, propylene glycol, butylene glycol, diethylene glycol, dipropylene glycol, triethylene glycol, tetraethylene glycol, butylene diol, pentane diol, hexane diol, neopentyl glycol bisphenol A and alkoxylated derivatives thereof such as polypropylene oxide bisphenol A and alike as well as mixtures thereof. Polyols having more than two hydroxy groups which may be employed in minor amounts to form branch chains can be selected from saturated aliphatic polyols such as glycerol, trimethylolethene, trimethylolpropane, pentaerythritol, arabitol, xylitol, dulcitol, donnitol, sorbitol, mannitol and alike as well mixtures thereof. In addition alaphatic aromatic diols and polyols may be employed as well as halogenated and alkoxylated derivatives thereof. In most instances the condensation products contain unreacted carboxylic acid or hydroxyl groups at the end of the chain branches. In the present invention the active hydrogens remaining on the hydroxyl or carboxyl group may be removed by neutralization but such precautions are not considered necessary to prevent cross linking to the thickener chain because the reaction of the amine with the isocyanate takes place more readily.

Preparation A

A polyester resin is prepared by condensing equal molar quantities in a resin kettle of isophthalic acid, propylene glycol, dipropylene glycol, and maleic anhydride until an acid number of no less than 25 is obtained and thereafter dissolving of the resin in styrene to form a 60% resin in styrene solution.

Polyesterurethane Resins

Other ethylenically unsaturated resins may be added along with or in place of polyester resin such as vinyl ester urethane resins such as those disclosed in U.S. Pat. Nos. 3,876,726; 3,297,745; 3,371,056; 3,509,234; 3,641,199; 3,642,943; 3,677,920; and commonly assigned application Ser. No. 927,461 of Ford filed July 24, 1978, now U.S. Pat. No. 4,182,830. These polyurethanes have the general formula:

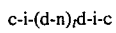

wherein d is a radical derived from an organic polyol, n is a radical derived from an unsaturated aliphatic dicaboxylic acid or an anhydride thereof, i is a radical derived from a polyisocyanate, c is a carbamyl-linked radical derived from a hydroxy-terminated ester of acrylic or methacrylic acid, and t is an integer of 1–5; and must be substantially free of unreacted-NCO groups so as to preclude the formation of urea crosslinkes with the polyurea thickener chain.

Preparation B—Polyester Urethane Resin

Into a two liter reaction flask equipped with a stirrer, thermometer, nitrogen inlet tube and distillation head there is added 4 mols of polyoxypropylene bisphenol A containing an average of 2.2 mols of propylene oxide per mol of bisphenol A and 2 mols of maleic anhydride. The resulting reaction mixture is heated to between 210°–215° C. 1 mol of the diester which results is further reacted in the presence of 1.44 grams of hydroquinone, by heating to 80° C. with 2 mols of hydroxy-propylmethacrylate and 2 mols of toluene diisocyanate and mixing for a period of 1 hour. The reaction mixture is permitted to rise to a temperature of 135° C. and held at that point for ½ hour. The resultant light colored solid has a melting point of 97° C., an acid number of 7.6, a saponification number of 201, a hydroxyl number of 22, and no residual unreacted isocyanate. The resulting resin is ground to a white finely divided powder and dissolved in styrene to form a 50% solids containing solution.

Preparation C—Polyester Urethane Resin

Into a reactor equipped with a stirrer, thermometer and dry air inlet tube were added 0.358 gram mols of a hydroxy-terminated polyester oligomer formed by reacting 4 molar equivalents of polyoxypropylene (2.2) bisphenol A with 2 molar portions of maleic anhydride, heated to 80° C. with 182 grams of styrene and 190 grams (1.22 mols) of 94% hydroxypropyl methacrylate after which the temperature dropped to 45° C. At this point 255 grams (0.717 mols) of RUBINATE M, crude polymethylene polyphenyl isocyanate having an average of 2.7 mols-NCO grams per mol, were added dropwise causing the temperature to rise to about 79° C. The temperature of the mixture was raised to 90°–95° C. and held for 5 hours after which point no detectable amount of free-NCO groups could be found by infra-red analysis. Additional styrene was added to yield a 50% solid styrene solution. This resin-styrene solution has a viscosity of 380 cps (No. 2 spindle in Brookfield at 30 rpm) at room temperature. The resin styrene solution has an acid number of 2.8, a saponification number of 101 and a hydroxyl number of 5.8.

Polyisocyanurate Resins

The polymer-in-monomer solution may also include polyisocyanurate resins such as poly(1,3,5-tri-R substituted S-triazine-2,4,6 trione) wherein the R group may contain ethylenic unsaturation or groups reactive with ethylenically unsaturated materials. R groups may also be linked with epoxy, polyurethane and polyester resins. Such isocynanurates are represented by U.S. Pat. Nos. 2,952,665; 3,041,313; 3,821,098; 3,850,770; 3,719,638; 3,437,500; 3,947,736; 3,763,269; 4,218,537 and commonly assigned copending application Ser. No. 923,265 to Markiewitz, et al. filed July 10, 1978, now U.S. Pat. No. 4,195,146. For the purpose of this disclosure polyisocyanurate resins can be considered as cross-linked networks of isocyanurate rings having ethylenically substituted aromatic pendent groups. Aromatic rings may be linked to either ethylenically unsaturated moieties through carbamyl, urylene, ether, carbonyl, carboxyl, and combinations thereof. In most instances satisfactory resins are prepared by reacting a polyisosyanate with hydroxyl-terminated ethylenically unsaturated compounds such as ethylenically unsaturated monohydroxy alcohols, monohydroxy ethylenically unsaturated esters, monoamino ethylenically unsaturated esters, monohydroxy ethylenically unsaturated ureas, ethylenically unsaturated monoamines, ethylenically unsaturated hydroxyl amines and polyalkoxylated vinyl alcohols to name a few. Monohydroxy compounds are reacted under conditions which favor their reactivity with one isocyanate of each molecule of the polyisocyanate aromatic compound. It is well understood however that some of the polyisocyanate molecules go competely unreacted while others go completely reacted to form polyurethane.

Preparation D—Polyvinyl Isocyanurate Resin

Into a chemical reactor equipped with agitator, condenser, gas pipe connections, vents, and port holes which is first flushed with nitrogen and thereafter sparged with 2 cfm. air and 6 cfm. nitrogen is added 2,680 parts of hydroxypropyl methacrylate and agitated at 30 revolutions per minute. Thereafter, 2.5 parts copper acetate catalyst, 12 parts of a 20% solution of t-butyl catechol and 5,743 parts styrene is charged to the reactor. The contents of the reactor are adjusted to 42°±2° C. and thereafter aparged with 3-4 cfm. nitrogen. Under increased agitation, 50-60 revolutions per minute, 3,063 parts of toluene diisocyanate is added at a rate of 60-70 parts per minute in four 766 part portions. After the first 766 part portion is added, the temperature is permitted to rise to 60-70 parts per minute in four 766 part portions. After the first 766 part portion is added, the temperature is permitted to rise to 65° C. After the second portion, the temperature is permitted to rise to 90° C. and after the fourth portion, the temperature is permitted to go higher than 93° C. The reaction mix is permitted to stir for one additional hour at 90° C. at which time the unreacted isocyanate content should be less than 4.5%. The reaction mix is cooled to 55° C. and then mixed with 18 parts N-benzyl trimethyl ammonium hydroxide as a 40% methanol solution.

The exothermic trimerization reaction takes place with additional cooling, the reaction mixture should not be permitted to go above 60° C. The reaction is permitted to continue until the unreacted isocyanate content in ranges between 0.05-0.15% and the viscosity ranges between 425-275 cps. At this point, 6 parts of methanesulphonic acid is added to inhibit the activity of the trimerization catalyst. The styrene/polyisocyanurate resin solution is stored for later use under conditions which inhibits further polymerization.

The reaction product has a number average molecular weight of about 1160, a weight average molecular weight of about 2000, and a polydispersity of about 1.9. About 95% of the isocyanurates present have a molecular weight of below about 5200 and contain some isocyanurates having a molecular weight about 5200 and below about 26,000. This product corresponds to a resin where the number of isocyanurate rings in most of the isocyanurate molecules is less than 10. This product has a ball and ring melting point of about 95° C. and a viscosity (in 50% styrene solution) of about 400-600 cps at 25° C., and a refractive index of about 1,557 $ND^{20}$. The infra-red spectrum of this product shows absorption bands characteristic of isocyanurates and the essential absence of isocyanate functionality. The hydroxyl number of the product is essentially zero.

Preparation E—Polyvinyl Isocyanurate Resin

This example illustrates the preparation of an allophanate-free resin from a resin containing a large amount of allophanate.

A small reaction vessel is charged with 100 g. of a resin prepared according to Example A, which by NMR analysis had an allophanate to urethane ratio of 0.45. 0.4 ml of Triton B (40% solution of benzyltrimethylammonium hydroxide in methanol) is added and 0.5 ml of a 10% solution of equal amounts of t-butylcatechol and the monomethyl ether of hydroquinone. The resulting mixture is heated for 1½ hours at 95° C. The final product is free of all detectable allophanate linkages upon NMR analysis.

Tractable shaped articles capable of being further shaped having from 5-95% by weight ethylenically unsaturated polyisocyanurate resin having 1-3 vinylidene groups per isocyanurate ring or its equivalent in a solution with at least one ethylenically unsaturated monomer which will react with ethylenically unsaturated groups in the isocyanurate resin can be made by thickening a homogeneous mixture of the polyisocyanurate resin/ethylenically unsaturated monomer solution with polyurethane made in solution therewith by reacting an aromatic polyisocyanate having 2-5 isocyanate groups per mol with a polyol having a molecular weight of about 300-2,000 and wherein the mol ratio of the total hydroxyl groups to isocyanate groups in the reaction mix is held between 0.66 and 0.95.

ETHYLENICALLY UNSATURATED MONOMERS

Ethylenically unsaturated monomers in addition to styrene may be selected from vinyltoluene, divinylbenzene, acrylic acid esters, methacrylic acid esters, such as methylacrylate, ethylacrylate, n-butylacrylate, 2-ethylhexyl acrylate, methyl methacrylate, pentaerythritol triacrylate, ethylene glycol dimethacrylate, diallylphthalate, diallylmaleate, diallylfumarate, triallylcyanurate, vinylacetate, vinylpropionate, divinylether, acrylonitrile, butadiene, and the like. In general, by ethylenically unsaturated monomer is meant a monomer containing at least one ethylenically unsaturated group which will react with the ethylenically unsaturated group in a polyester or itself. The proportion of monomer or monomers in the solution may be in the range of 30-70% and preferably in the range of 40-60% by weight.

Polyamine Polyurea Precursers

Aliphatic, cycloaliphatic and aromatic polyamines free of ethylenic saturation are preferred polyurea precursors in that they form individual polyurea chains which are relatively cross-linked with the a polymer chain formed by the copolymerization of the ethylenically unsaturated resin and monomers in solution therewith.

Aryl diamines and mixtures thereof such as metaphenylene diamine, paraphenylene diamine, naphthalene diamine, benzidine, bis(4-amino-phenyl)methane, 4,4'-diaminodibenzyl, di(para-aminophenyl)ether, 3,3'-diaminodiphenyl sulfone, 4,4'-diaminodiphenyl sulfone and halogenated derivatives such as those containing halogen on the benzenoid ring such as 3,3'-dichlorobenzidine, bis,4-amino-2-chlorophenyl(propane), bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3, 5,5-trimethyl cyclohexane, hydrogenated di-(aminophenyl)methane, hydrogenated methylene dianiline, diamino menthane, and hydrogenated toluene diamine. The most useful of these are those that are liquids up to 75° C. For those which are solids under these conditions, vinylidene monomer solutions can be employed to form the homogeneous mix rapidly.

In addition to the amines cited above, preferred results are obtained by using polyoxyalkylene polyamines and cyanoalkylated polyoxyalkylene polyamines having a molecular weight of about 190 to about 2,000 with a preferred range of about 190 to about 1,000 which have the general formula:

$$H_2NCH_2\text{-}CXH(OCH_2CHX)_yNH_2$$

where X is H or alkyl group having 1-18 carbon atoms and where y is a number from about 2 to about 16; and triamines of polyalkoxylated trimethylol propane having the general formula:

$$CH_3CH_2C[CH_2(O\ CH_2\text{-}CHX)_zNH_2]_3$$

where z is an average of 1-11 are also useful starting materials for the compounds of my invention. These amines are prepared according to the procedure outlined in a U.S. Pat. No. 3,666,788 the teachings of which are hereby incorporated by reference. These materials have the general formula:

$$R[OCH_2CHX)_nOCHYCHZ\ NHA]_m$$

where R is the nucleus of an oxyalkylation-susceptible aliphatic polyhydric alcohol containing 2-2 carbon atoms and 2-8 hydroxyl groups, A is hydrogen or a cyano-lower-alkyl radical having one or two carbon atoms between the nitrogen and cyano radical provided at least one A is a cyano-lower-alkyl radical, Z is an alkyl group containing 1-18 carbon atoms, X and Y are hydrogen or Z, n has an average value of 0-50 and m is 2-8, R is saturated and consists of carbon and hydrogen. The methyl and ethyl alkyl groups of A may be substituted by lower alkyl groups.

Of particular interest for the practice of the invention are cyanoethylated polyoxypropylene diamines having molecular weight in the range of 230-2,000; and polyoxypropylene triamine and cyanoethylated polyoxypropylene triamine having molecular weights ranging from 400-2,000.

In the practice of the invention a homogeneous mixture containing the unsaturated monomer and ethylenically unsaturated resin is prepared and thereafter mixed with the polyamine. In some instances heat must be applied to aid in dissolving the ingredients to form a homogeneous solution. If the solution is to be stored for any length of time it is advisable to add free radical scavenger-cure type inhibitors such as hydroquinone, toluhydroquinone and tert-butyl catechol.

Free-radical initiater catalyst such as a for example peroxide selected from benzoyl peroxide, tert-butyl benzoate, 1,1-bis(t-butylperoxy)3,3,5-trimethylcyclohexane or 2,4-pentanedione peroxide can be added at this point to insure a homogeneous mixture. Such peroxide catalysts are normally used in combination with a cure accelerator such as cobalt naphthenate or amine such as a dimethylaniline.

The selection of the free-radical catalyst is important if one is to control the time at which the addition polymerization takes place. Free-radical catalysts may also be used if lower temperatures are preferred. In the performance of the molding step it is preferred that the addition polymerization of the monomer or its copolymerization with the ethylenically unsaturated resin takes place after the gelation or thickening step caused by the formation of polyureas. Normally it is preferred that the addition polymerization take place within the mold at temperatures of the mold and therefore the a catalyst should be selected such that it is heat activated at this point.

Polyisocyanate Polyurea Precursor

The polyisocyanates used in the formation of the polyurea thickener system may be bifunctional or trifunctional or of even higher functionality. Polyisocyanate may be aliphatic, cycloaliphatic or aromatic or may contain in the same polyisocyanate molecule aliphatic and aromatic isocyanate groups, aliphatic and cycloaliphatic and aromatic isocyanate groups aliphatic and cycloaliphatic isocycanate groups, cyclo-aliphatic and aromatic isocyanate groups, cyclo-aliphatic and aromatic isocyanate groups, cyclo-aliphatic and aromatic isocyanate groups or even aliphatic-cycloaliphatic and aromatic isocyanate groups. If desired mixtures of two or more different polyisocyanates may be employed. Examples of polyisocyanate include 4,4'-diphenylmethane di-isocyanate, 2,4-and 2,6-toluene di-isocyanate in mixtures thereof, isophorone diisocyanate, tetramethylene diisocyanate, pentamethylene diisocyanate, hexamethylene diisocyanate and 4,4'-dicyclohexylmethylene diisocyanate. Particularly useful is polymethylene polyphenyl isocyanate which comprises a mixture having 2-6 isocyanate groups per molecule and which has a functionality averaging between 2.1 and 3 isocyanate groups per mol and most often 2.3-2.7 isocyanate groups per mol and is sometimes referred to in the art as crude MDI.

The thickening reaction is carried out by the intermixing of the polyisocyanate either neat or in solution with solvents with the polymer in monomer solution containing polyamine such that the mol ratio of —NH₂ groups on said polyamine to the —NCO groups on said polyisocyanate is in the —NH$_2$/—NCO range of 0.8–1.2 and preferably about 1. The amine-isocyanate reaction is very fast, quantitive and predictable with no substantial interaction with the resin solution taking place. Once all the amines and isocyanate groups have reacted to form the polyurea there is no further reaction. Consequently, the maturated or handleable molding compound remains at the same viscosity indefinitely. Since the maturation reaction is independent of the resin there is no need for the presence of carboxyl or hydroxyl groups. However, polyurea can be used to thicken conventional polyester resins (those having carboxyl or hydroxyl groups) as well as the other ethylenically unsaturated resins having no active hydrogens. In cases where a very fast gelation is desired a low molecular polyamine is employed.

While the polyurethane thickening methods require a select polyol blend to obtain a desired consistency the polyurea systems are less critical in this respect and require no catalysts so that they may be prepared quickly to form homogeneous gels of greater uniformity. This feature offers a particular advantage when it is desired to maintain a uniform dispersion throughout the gel of particulate matter such as fillers, pigments and reinforcing agents. Therefore the physical properties of the fully cured shaped articles of the invention are particularly uniform throughout. Such physical properties include flexural and notched impact strength which are improved by the incorporation fiberous reinforcing materials which are mixed with the resins prior to gelation. Fibrous material may include for example glass fibers, aciculor rutile, graphite fibers, asbestos fibers or fibers spun from organic polymers for example polyesters. These fibrous materials may be of any suitable form for example in the form of veils, cloth, a matte, ribbon, tapes, continuous fiber or as chopped fiber, and may range in length from fibrids up to 1–5 cm.

The amount of filler or reinforcing materials to be incorporated depends upon the desired improvement in a particular property of the shaped article. In general from 5–80% of fibrous materials such as fiberglass may be incorporated. To gain a substantial improvement in strength properties usually 60–80% by weight of fibrous material produces the desired result for most applications. In addition to reinforcing material other fillers such as carbon black, clay, iron oxide, lithopone, mica, siliceous materials, titanium dioxide and colored pigments may be added at some convenient time either prior to or during the gelation step.

Suitable shaping methods include casting and compression molding. For example a shaped article may be produced by charging the components of the mixture into a suitable mold in which they are first gel polymerized to form what is often referred to as a preform. The mixture may also be compressed during the gel polymerization.

It has been found that the initially shaped gel preform of the invention may be further shaped when the components of the mixture are in a partially gelled stage by first forming a tractable shape of simple profile before the system becomes completely gelled or while the ethylenically unsaturated ingredients polymerizes as previously described; and causing or allowing the thus preshaped gel to retain its shape while completing both polymerization reactions.

The preshaping process of the invention may be effected on any shape, partially gelled polymerized form of simple profile which may have contain fibrous reinforcement. It also can be adapted to preshaping of a partially gelled polymerized article in the form of sheets or pellets. The preshaping may be carried out by causing a preform of simple profile to form in the contours of a mold for example by mechanical or vacuum means or by combinations thereof. Shaped article of simple profile may be further shaped by pressing between the cooperating parts of a mold or by draping over a vacuum molding device.

In many instances a preshaped or preformed article may be removed from the mold after the polyamine/diisocyanate reaction has taken place and before the addition polymerization has substantially begun. If the gel polymerized article does not retain its shape the vinyl polymerization may be started while the article is in the preform mold to increase its rigidity and thereafter the article can be removed from the preform mold and injected quickly into another mold thereby retaining a final shape while both polymerization reactions are going to completion. Furthermore the original liquid monomer solution may be thickened by the resultant effect of the formation of polyurea and the a addition reaction such that the thickening takes place as a result of two independent and separate polymer chains.

It may be desirable to react the ethylenically unsaturated ester/monomer partially or almost completely before further shaping and molding. On the other hand where the mixture comprises a large portion of the polyurea it may not be necessary to complete the reaction between the a monomer and the ethylenically unsaturated resin before molding. The composition should of course not be gel polymerized or thickened to the point of intractability as to prevent the further shaping. Reaction conditions must be established by experimental trial with catalysts, resin ingredients, fillers, mold release agents and coupling agents well known to the art to gain the desired result.

The invention can be a better understood by the illustrations in the following examples in which all parts are expressed as parts by weight:

EXAMPLE 1

80 parts of a 50% solution in styrene of poly(1,3,5-tri-R substituted-triazine-2,4,6-trione) wherein the R group is the mono aduct of hydroxypropylmethacrylate with toluenediisocyanate (80/20 mixture of 2,4- and 2,6-toluenediisocyanate) prepared as shown in Preparation D were mixed with 20 parts of a cyanoethylated polyoxy propylene diamine having a molecular weight of 2000 (available from Jefferson Chemical Company under the trademark Jeffamine CD-2000).

EXAMPLE 2

90 parts of a 50% styrene solution of vinylmaleate urethane polymer made according to procedure outlined in Preparation B was intermixed with 10 parts of cyanoethylated polyoxy propylene diamine having a molecular weight of 2,000 as provided by Jefferson Chemical Company under the trademark Jeffamine CD-2000.

EXAMPLE 3

90 parts by weight of a 60% solution of isophthalic polyester resin made according to Preparation A in styrene was admixed with 10 parts by weight of Jeffamine CD-2000.

EXAMPLE 4

95 parts of a 50% solution of polyisocyanurate resin described in Preparation E and 5 parts of Jeffamine CD-400 were intermixed to form a homogeneous solution.

EXAMPLE 5

92.5 parts of 50% polyisocyanurate resin prepared according to Preparation E was admixed with 7.5 parts of Jeffamine CD-400, 0.35 parts of toluhydroquinone, and 1 part 1,1-bis(tert-butylperoxy)3-dimethyl-5-methylcyclohexane.

EXAMPLE 6

93.5 parts of a 50% styrene solution containing polyvinylisocyanurate of Preparation D and 6.5 parts of polyoxypropylene diamine was a admixed with 0.35 parts toluhydroquinone, 1 part peroxide catalyst and 3 parts zinc stearate.

EXAMPLE 7

91 parts of 50% solution of polyisocyanurate resin Preparation D and 9 parts Jeffamine CD-400 was admixed with 0.35 parts toluhydroquinone, 1 part peroxide catalyst and 3 parts zinc stearate.

EXAMPLE 8

86 parts of 50% solution in styrene of Preparation D and 9.25 parts of Jeffamine CD-400 was admixed 0.35 parts toluhydroquinone and one part peroxide catalyst and 3 parts zinc sterate.

EXAMPLE 9

82 parts of Preparation D, 16 parts of Jeffamine CD-2000 a cyanoethylated polyoxy propylene diamine having a molecular weight of 2,000, 0.2 parts of a 10% solution of tert-butylcatecol, 1.5 parts of tert-butylperbenzoate, 0.5 parts 2,4 pentadione peroxide, 0.5 parts cobalt naphthenate and a 0.4 parts dimethylaniline were mixed together and stored.

EXAMPLE 10

85 parts of a 50% styrene solution of vinylmaleate urethane resin prepared according to Preparation B 15 parts Jeffamine CD-2000 and one part peroxide catalyst were mixed and stored.

EXAMPLE 11

266 parts of the 50% styrene solution of Preparation D and 52 parts of Jeffamine CD-2000 were admixed with 0.65 parts of a 10% solution of tert-butylcatecol, 4.88 parts t-butylperbenzoate, 1.63 parts of 2,4 pentadione peroxide, 1.63 parts cobalt naphthanate and 1.3 parts dimethylaniline.

EXAMPLE 12

270 parts 50% styrene solution of Preparation D, 30 parts Jeffamine CD-230 cyanoethylated polyoxy propylene diamine having a molecular weight of 230 were admixed with 1.5 parts cobalt naphthenate, 4.5 parts tert-butylperbenzoate, 1.5 parts 2,4 pentadione peroxide, 1.2 dimethylaniline.

The resin solutions of Examples 1-12 are stable and can be stored under normal conditions for long periods of time without polymerization.

EXAMPLES 13-24

Gel times (minutes required to reach three dimensional integrity capable of holding itself together) and viscosity measurements using a Brookfield Type LVF Viscosimeter, 30 RPM, No. 4 spindle for the amine styrene resin solutions of Examples 1-10 are measured after the addition thereto of varying amounts of polyisocyanates such as polymethylene polyphenyl isocyanate having a functionality of 2.7 and available as MDI under the trademark Rubinate M from Rubicon Chemical Corp.; a similar polyisocyanate having a functionality averaging 2.3 also referred to as MDI-2.3 available under the trademark PAPI 901; and toluene diisocyanate referred to as TDI (80/20 mixture of 2,4- and 2,6- toluene diisocyanate). Proportions and results of these measurements are tabulated in Table I.

TABLE I

| | Gel Times For Polyurea Thickened Resins | | | |
|---|---|---|---|---|
| Example No. | Amine Solution of Ex. No. (100 Parts) | Polyisocyanate | Parts by weight | Gel Time (minutes) |
| 13 | Ex. 1 | RUBINATE M | 2.57 | 1 |
| 14 | Ex. 2 | " | 1.30 | 5 |
| 15 | Ex. 3 | " | 1.30 | 1 |
| 16 | Ex. 4 | " | 2.55 | Stable at 3,000 cps |
| 17 | Ex. 5 | " | 3.82 | Stable at 14,400 cps |
| 18 | Ex. 6 | " | 4.33 | 1 |
| 19 | Ex. 7 | " | 4.82 | 30* |
| 20 | Ex. 8 | " | 4.95 | 50* |
| 21 | Ex. 9 | RUBINATE M | 2.10 | 20* |
| 22 | Ex. 10 | TDI | 1.28 | — |
| 23 | Ex. 11 | RUBINATE M | 3.42 | — |
| 24 | Ex. 12 | PAPI 901 | 7.93 | — |

*(% Mins. to 100,000 cps)

EXAMPLE 25

300 parts of a composition made according to Example 11 was reacted to 6.83 parts of Rubinate M. The solution was then deaired and poured into a glass mold and allowed to gel at ambient temperature. The next day the casting or preform was post cured at 100° C. for four hours. Mechanical properties for this casting are listed in Table II.

EXAMPLE 26

300 parts of a composition made according to Example 12 were reacted with 23.88 parts of Papi 901 then deaired and placed in a mold. The mixture gelled and was permitted to sit for one day at room temperature and thereafter post cured at 100° C. four hours. Mechanical properties of this material are listed in Table II.

In order to demonstrate the fact that substantially no loss in strength occurs in compositions using a polyurea thickening a component, 300 parts of a vinyl isocyanurate resin preparation containing 1.5 parts cobalt naphthenate, 4.5 parts t-butylperbenzoate, 1.5 parts 2,4-pentanedione peroxide solution in 1.2 parts dimethylaniline were mixed and placed in a mold and fully cured as described in Example 26. The mechanical properties obtained for this material indicated that no substantial loss in strength resulted for the same polyvinyl isocyanurate cured in the absence of a polyurea thickener system of the invention. The mechanical properties for these resins are shown in Table II for purpose of comparison.

TABLE II

| | Mechanical Properties | | |
|---|---|---|---|
| Comparative | Ex 25 | Ex 26 | Example |
| Flexural Modulus, psi × $10^6$ | 0.73 | 0.53 | 0.54 |
| Flexural Yield, psi | 15520 | No yield | No yield |
| Flexural Strength, psi | 16600 | 12820 | 17800 |
| Tensile Modulus, psi × $10^6$ | 0.38 | 0.54 | 0.54 |
| Tensile Strength, psi | 8600 | 7900 | 9000 |
| Tensile Elongation, % | 4.95 | 1.67 | 1.89 |
| Barcol Hardness | 24–26 | 36–41 | 42–44 |
| Charpy Impact, Unnotched, | 8.07 | 3.37 | 3.42 |
| HDT, °C. | 102 | 118 | 133 |

What is claimed is:

1. A resin blend useful in preparing non-sticky molding compositions by the reaction therewith of polyisocyanate which comprises: an ethylenically unsaturated monomer containing dissolved therein 30–70% by weight of a resin selected from the group consisting of vinyl terminated polyester urethane resin, ethylenically unsaturated polyester resins, and ethylenically unsaturated polyisocyanurate resins, and 1.5–30% by weight of at least organic polyamine polyurea precursor free of ethylenic unsaturation selected from the group consisting of polyalkylene polyamines and cyanoalkylated polyoxyalkylene polyamines having a molecular weight of about 190–2000 having a general formula selected from the group consisting of:

$$H_2NCH_2\text{-}CXH(OCH_2CX)_yNH_2$$

wherein X is H or an alkyl group having 1–18 carbon atoms and where y is a number of about 2 to about 16, A triamine of polyalkoxylated trimethylol propane having the general formula:

$$CH_3CH_2C[CH_2(O\text{-}CH_2\text{-}CHX)_zNH_2]_3$$

where z is an average of 1–11, and
A cyanoethylated polyoxyalkylated polyamines having the general formula:

$$R[(OCH_2CHX)_nOCHYCHZNHA]_m$$

where R is the nucleus of an oxylation-susceptible aliphatic polyhydric alcohol containing 2–12 carbon atoms and 2–8 hydroxyl groups, A is hydrogen or a cyano lower alkyl radical having 1 or 2 carbon atoms between the hydrogen and the cyano radical provided at least one A is a cyano-lower-alkyl radical, Z is an alkyl group containing 1–18 carbon atoms, X and Y are hydrogen or Z, n has an average value of 0–50 and m is 2–8, R saturated and consists of carbon and hydrogen wherein there is a reaction product of the polyisocyanate with the polyamine polyurea precursor.

2. A composition of claim 1 wherein said ethylenically unsaturated polyester resin is a condensation product of a polyol, an unsaturated dicarboxylic acid and an aromatic dicarboxylic acid.

3. A composition of claim 2 wherein at least one of said polyols is a polyalkoxylated bisphenol A compound.

4. A composition of claim 1 wherein said vinylester urethane resin is a product of the following general formula:

c-i-(d-n)$_t$d-i-c wherein d is a radical derived from polyalkoxylated bisphenol A compounds, n is a radical derived from an unsaturated aliphatic dicarboxylic acid or an anhydride thereof; i is a radical derived from a polyisocyanate; c is a carbamyl-linked radical derived from a hydroxy-terminated ester of acrylic or methacrylic acid; t is an integer equal to from 1 to about 5.

5. A composition of claim 4 wherein said vinylester urethane resin is a condensation product of polyoxyalkylene bisphenol A having 2–60 mols of ethylene oxide or propylene oxide per mol, n is derived from maleaic anhydride or maleaic acid, i is a radical derived from a group selected from toluene diisocyanate or a polyisocyanate having 2.4–3 isocyanate groups per mol.

6. A composition of claim 1 wherein said ethylenically unsaturated monomer is selected from the group consisting of styrene, ethylacrylate, propylacrylate, isopropylacrylate, hexane diol diacrylate, 2 ethylhexyl acrylate, 2 ethylhexyl methacrylate, butyl acrylate, butyl methacrylate, neopentyldiol dimethacrylate, pentaerithritol triacrylate, pentaerithritol trimethacrylate, vinyl toluene, divinyl benzene, trialeylisocyanurate, vinyl acetate, diallylfumerate, divinyl ether and acrylonitrile.

7. A composition of claim 1 wherein said ethylenically unsaturated monomer is styrene.

8. A composition of claim 1 wherein said polyamine is a cyanoethylated polyoxypropylene diamine having a molecular weight in the range of 230–2,000.

9. A composition of claim 1 wherein said polyamine is selected from a polyoxy propylene triamine and cyanoethylated polyoxy propylene triamine having a molecular weight ranging from 400–2,000.

10. A composition of claim 1 further comprising a free-radical activation catalyst.

11. A composition of claim 1 comprising an amount of polyisocyanate wherein the mol ratio of the —NCO groups on said polyisocyanate to said amine groups on said polyamine ranges from 0.8–1.2.

12. A composition of claim 11 wherein said polyisocyanate is selected from the group consisting of 4,4'-diphenylmethane diisocyanate, 2,4- and 2,6'-toluene diisocyanate and mixtures thereof, isophorone diisocyanates, 4,4'-dicyclohexylmethane diisocyanate, polymethylene polyphenyl isocyanate having 2–6 isocyanate groups per molecule and mixtures thereof.

13. A composition of claim 12 wherein said polymethylene polyphenyl isocyanate has an average of 2.7 isocyanate groups per mol.

14. A composition of claim 12 comprising a reinforcing filler.

15. A composition of claim 14 wherein said reinforcing filler is selected from the group consisting of glass fibers, graphite fibers, asbestos fibers, and fibers derived from organic polymers said fibers ranging in size from fibrids to continuous filaments.

16. A handleable tractable composition made by permitting a composition of claim 11 to thicken by the formation of polyureas.

17. A fully cured intractable composition made by the process of shaping a composition of claim 16 and thereafter copolymerizing said ethylenically unsaturated monomer and resins in said reaction product of the polyisocyanate with the polyamine polyurea precursor by free-radical activation.

* * * * *